United States Patent [19]

Naccache

[11] 4,378,788

[45] Apr. 5, 1983

[54] SHEET-FLOW CONCRETE SOLAR COLLECTOR

[76] Inventor: Albert F. Naccache, 918 Ramona, Albany, Calif. 94706

[21] Appl. No.: 267,253

[22] Filed: May 26, 1981

[51] Int. Cl.³ ............................................. F24J 3/02
[52] U.S. Cl. ...................................... 126/445; 126/450; 126/900; 126/435
[58] Field of Search ............... 126/445, 444, 417, 431, 126/446, 448, 449, 450, 900, DIG. 2

[56] References Cited

U.S. PATENT DOCUMENTS

| | | | |
|---|---|---|---|
| 3,053,509 | 9/1962 | Haupt et al. | 237/69 X |
| 3,190,816 | 6/1965 | Adamec | 126/444 X |
| 3,390,672 | 7/1968 | Snelling | 126/433 |
| 3,943,911 | 3/1976 | Yu | 126/450 |
| 4,048,981 | 9/1977 | Hobbs | 126/450 X |
| 4,056,092 | 11/1977 | Meier et al. | 126/450 |
| 4,062,351 | 12/1977 | Hastwell | 126/445 X |
| 4,153,753 | 5/1979 | Woodman et al. | 126/901 X |
| 4,164,933 | 8/1979 | Alosi | 126/450 X |
| 4,170,984 | 10/1979 | Scheffee | 126/450 X |
| 4,221,210 | 9/1980 | Cvijanovich | 126/900 X |
| 4,257,481 | 3/1981 | Dobson | 165/168 |
| 4,261,330 | 4/1981 | Reinisch | 126/450 X |
| 4,267,822 | 5/1981 | Diamond | 126/417 |
| 4,274,396 | 6/1981 | Peters et al. | 126/448 X |
| 4,284,072 | 8/1981 | McKaneney | 126/449 X |
| 4,305,380 | 12/1981 | Allen | 126/425 |

*Primary Examiner*—Larry Jones
*Attorney, Agent, or Firm*—Owen, Wickersham & Erickson

[57] ABSTRACT

An open-flow concrete flat-plate solar collector has a grooved photothermal conversion surface coated with an impermeable selective coating of high capillarity. A special header insures spreading of the heat transfer fluid over the photothermal conversion surface even if the collector is not perfectly level. The collector is used in a closed loop heat exchanger system or a closed loop thermosiphoning system with, as a heat transfer fluid, distilled water to which is added an antistatic agent. The collector may be free-standing, or it can be added onto an existing inclined roof, or incorporated as an integral part of such roof. This collector preferably is used for applications up to 150° F.

15 Claims, 5 Drawing Figures

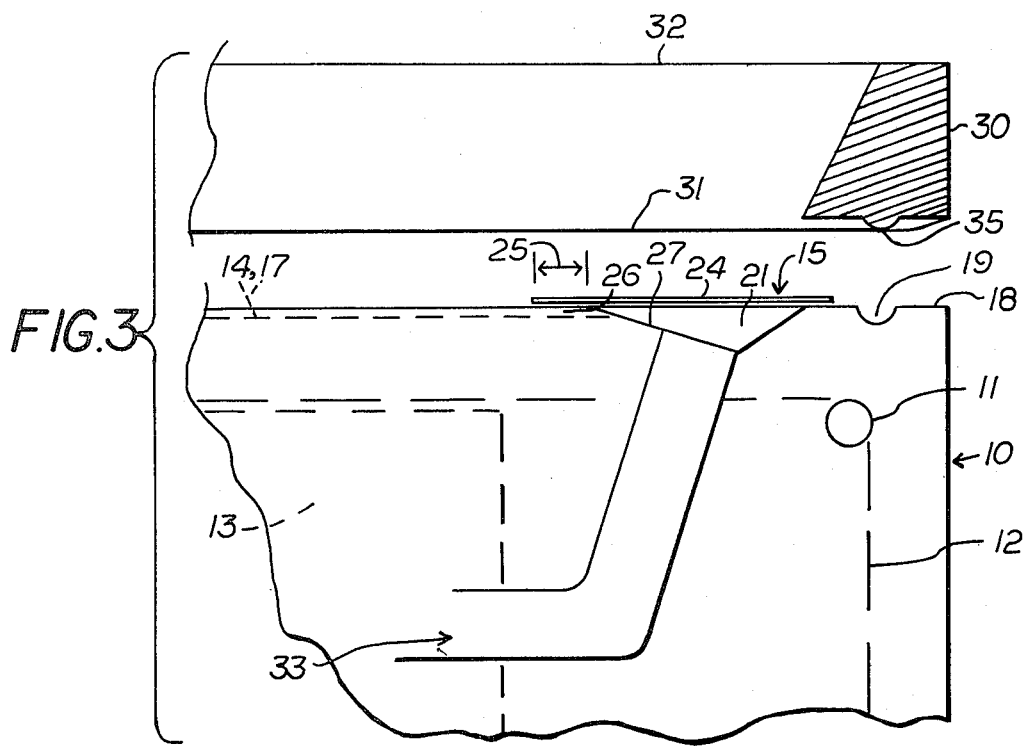
FIG. 3
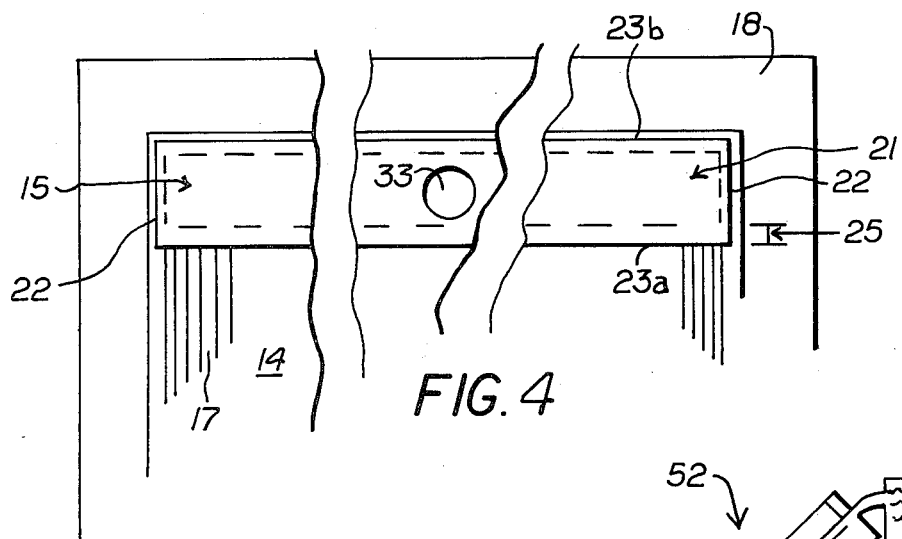
FIG. 4
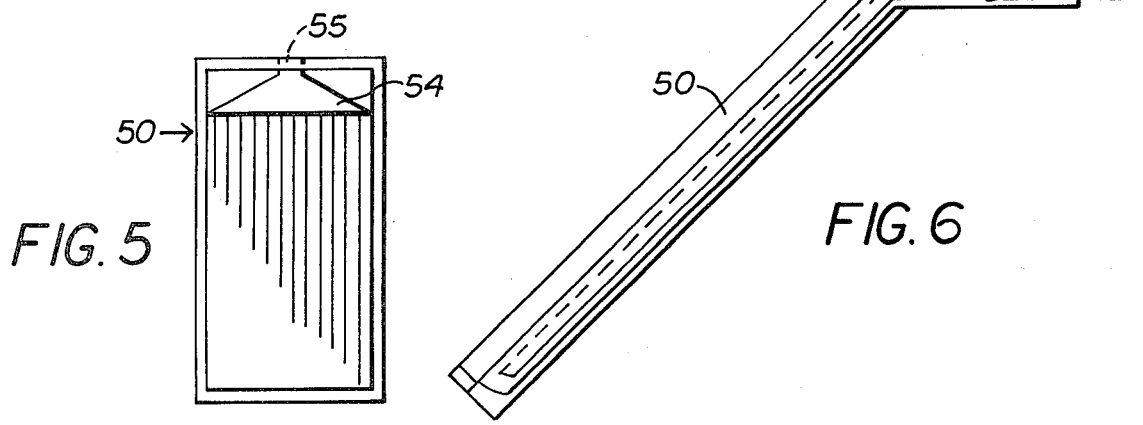
FIG. 5
FIG. 6

SHEET-FLOW CONCRETE SOLAR COLLECTOR

BACKGROUND OF THE INVENTION

The invention relates to solar collectors, and more specifically to an "open flow" type collector of economic materials, particularly concrete.

Solar energy collectors made of concrete have been known at least since 1904, when H. E. Willsie published his work "Experiments in the Development of Power From the Sun's Heat", *Engineering News*, N.Y., Vol. 61, No. 19, 1909. H. E. Willsie's collector can be described as an "open-flow", "gravity flow", "sheet flow" or "trickle" type solar energy collector. Such an open-flow energy collector made of concrete has many generic advantages such as durability, low-cost, low energy investment (and therefore short energy payback), and great flexibility in shape, size and other structural features.

However, and in spite of a large body of recent work on open-flow or sheet-flow energy collectors, there remain a number of unsolved problems pertaining to concrete open-flow solar collectors. My invention solves these problems, particularly the following:

1. High heat losses.

This category involves three different problem areas:

(a) Low insulation value of concrete, with the added problem of a further decrease in the insulation value of concrete resulting from its water permeability.

(b) High heat losses due to heat transfer from the photothermal conversion surface to the glazing, occurring when water vaporizes at that surface and condenses on the inside of the glazing.

(c) Radiation heat losses from the photothermal conversion surface that occur when the water film is not thick enough to filter the thermal infra-red reradiation.

2. Incomplete wetting of the photothermal conversion surface.

This is a simple mechanical problem, but failure to find a satisfactory solution drastically cuts the efficiency of the solar energy collector in direct proportion to the unwetted surface.

3. Air bubbles.

In the case of sheet-flow, where a water film is flowing directly between a photothermal conversion surface and a glazing, air bubbles tend to form on the glazing and, through a combination of electrostatic and hydrostatic forces, acquire spatial stability. These air bubbles increase reflection of impinging solar energy and disrupt the continuity of the heat transfer fluid sheet flow over the photothermal conversion surface, with adverse effects on collection efficiency.

4. Deposits.

The photothermal conversion surface in typical open-flow collectors is exposed daily to the drying of the water film, and with most types of water, tap or well, this repeated drying, sometimes under high insolation, will cause deposits of salts and minerals that were in suspension or solution in the water. Such deposits can quickly cut down on the absorption characteristics of the photothermal conversion surface.

5. Cost of construction, transportation and erection.

Thin concrete edges are brittle and should be avoided, and the concrete collector should be designed to simplify handling, transportation and installation.

The patents and publications in the following brief survey represent the most pertinent prior art pertaining to open-flow and concrete open-flow or sheet-flow collectors of which I am aware.

H. E. Willsie (U.S. Pat. No. 1,101,001) does not provide explicit means to insure wetting of the whole photothermal conversion surface, nor does he contain the water sheet to prevent heat loss through evaporation. Yu's (U.S. Pat. No. 3,943,911) disclosure is similar in some broad respects to my invention, but does not disclose any means to insure wetting of the whole conversion surface, any means to decrease reradiation from the conversion surface, any means to increase absorption, nor any means to prevent deposits buildup. The same can be said of Meier et al. (U.S. Pat. No. 4,056,092) invention, or of the collectors described by P. R. Payne and D. W. Doyle, "The Fossil Fuel Cost of Solar Heating" Society of Automotive Engineers, 1978. In addition, the latter collectors do not prevent evaporation. Isaacson (U.S. Pat. No. 4,153,037) discloses a grooved conversion surface on a plastic or glass-based collector, but without concern for the shape or size of the grooves, and further without means of insuring even flow over all the grooves, or containment of the fluid sheet. Robinson, Jr. et al. (U.S. Pat. No. 4,074,705) discloses a header to evenly spread the heat transfer fluid, but of a cumbersome design. Scheffee (U.S. Pat. No. 4,170,984) is concerned with "Flooded Flow" but uses increased viscosity of the heating fluid to achieve it. Viestur et al. (U.S. Pat. No. 4,193,543) discloses an arrangement to regulate the flow of the heating fluid somewhat reminiscent of Willsie's, but that system does not provide for an even flow over all the conversion surface, and the system shares the same shortcomings with Yu and Meyer.

It is among the objects of the invention to improve on prior open-flow, flat plate type solar collectors by providing efficient solutions in the above problem areas, resulting in an open-flow or sheet-flow collector of greatly improved efficiency and cost effectiveness. Other objects, advantages and features will be apparent from the following description of a preferred embodiment, considered along with the accompanying drawings.

DESCRIPTION OF THE DRAWINGS

FIG. 3 is an exploded fragmentary sectional view showing preferred construction at the upper end of the solar collector, according to one embodiment of the invention.

FIG. 4 is a fragmentary plan view showing the structure represented in FIG. 3.

FIG. 5 is a plan view showing a collector of the invention as it would be stuctured for use in a thermosiphoning system, with heat transfer liquid flowing up the surface rather than down.

DETAILED DESCRIPTION OF PREFERRED EMBODIMENTS

Figure 1:
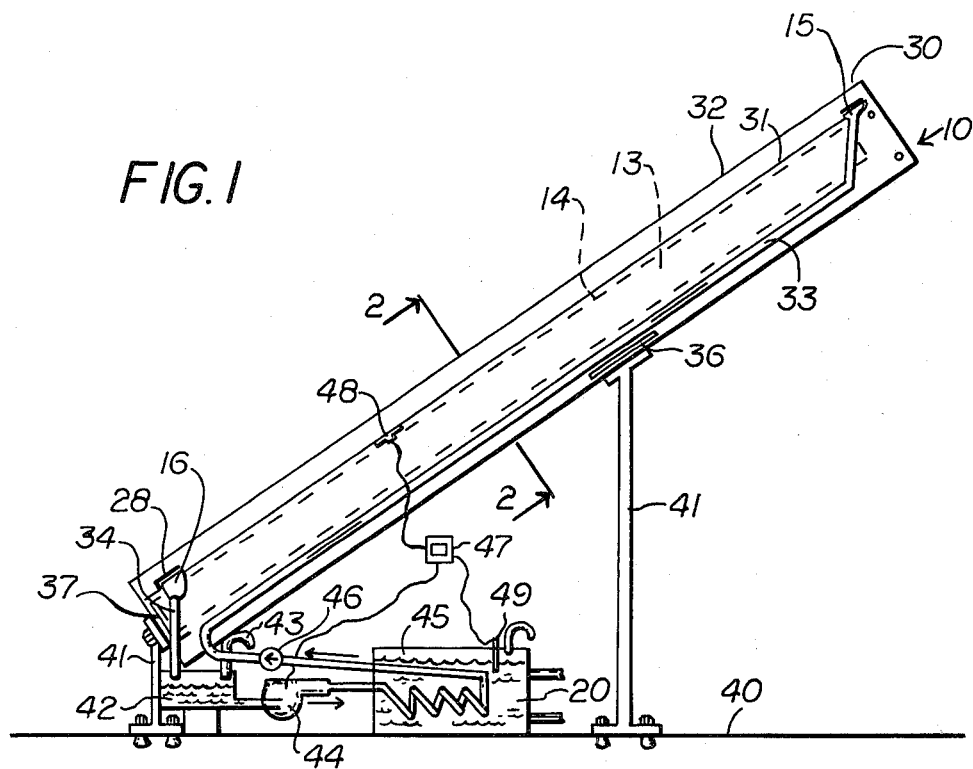
FIG. 1 is a side elevation cross sectional view, partially schematic, of a flat plate, open-flow solar collector system according to one embodiment of the invention.

Referring now to the drawings, it is seen that a solar collector according to the invention consists basically of two parts: A concrete slab 10 and a frame 30 supporting inner and outer glazings 31 and 32, with the heat transfer fluid 20 being contained and flowing between the slab 10 and the inner glazing 31.

The concrete slab 10 is of at least about two inch thickness, and preferably three inch or greater thickness, and is made of lightweight, or insulating or cellular concrete, reinforced with bars 11 and wire mesh 12. The slab preferably has formed voids 13, of any desired shape, spaced closely to the photothermal conversion surface 14 at the top of the slab. The formed voids improve the thermal insulation characteristics of the concrete slab 10, and their positioning insures that only a small mass of the concrete slab 10 will act as a heat sink or thermal mass.

The concrete slab 10 has formed in its photothermal conversion surface 14 a header 15 at the top (FIGS. 1, 3, 4), a collecting gutter or header 16 at the bottom (FIG. 1), and running between the two, parallel grooves 17. A border 18 along the periphery of the slab, preferably about one inch wide, has a groove 19 that serves to positively locate the double glazed frame 30.

The parallel grooves 17 define in the photothermal conversion surface 14 a volume such that the grooves 17 are substantially flooded by heat transfer fluid 20 during normal operation of the solar collector system.

FIG. 1 shows one form of installation of the solar collector and system of the invention.

In FIG. 1 the collector is shown installed on a substantially flat surface 40, secured on forward and rearward supports 41. The system includes a plenum or liquid receiving chamber 42 at the downstream (forward) end of the collector, provided with a pressure relief valve or simple opening to atmosphere 43. A pump 44 transfers the heated liquid from the plenum 42 through a heat exchanger 45, and then through a unidirectional flow check valve 46, as indicated. A differential temperature controller 47 connected to a thermal sensor 48 in the concrete slab 10 and to a thermal sensor 49 in the heat exchanger 45 activates the pump 44 when the desired degree of temperature differential exists. The heat transfer fluid is then pumped to the header 15 and returns by gravity, over the photothermal conversion surface 14, to the plenum 42.

The volume of the plenum 42 is sufficient to contain all the heat transfer liquid in the grooves 17 and in the header 15, as well as a reserve volume for airspace and reserve liquid for pumping when the liquid is circulating and the header 15 and grooves 17 are filled. The plenum 42 enables liquid always to flow unrestricted out the downstream end of the collector, rather than being affected by a variable head at the receiving end. Its level stays constant during continued operation of the system.

Figure 2:
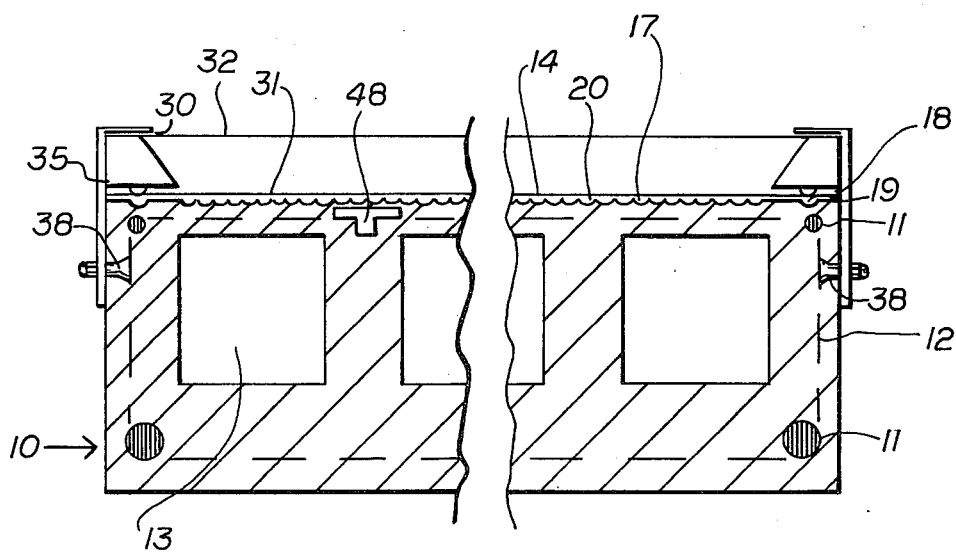
FIG. 2 is a sectional view of the collector, taken along the line 2—2 in FIG. 1.

In a system such as illustrated in FIG. 1 the grooves 17 preferably are of a "gothic arch" cross section, and may be about 0.070" deep and 0.100" wide, as shown in FIG. 2. As is known in the art, this shape helps increase absorption over a wide range of solar azimuth, by insuring at least two reflections of incoming solar radiation in the grooves. The grooves 17 also help spread the heat transfer liquid 20 over all the photothermal conversion surface 14, in the volume comprised beween the surface 14 and the inner glazing 31, preventing formation of rivulets and dry spots. The inner glazing 31 rests on top of the grooves, or is positioned very closely above the grooves in order to help in filming the heat transfer liquid in sheet flow, and to prevent heat loss through evaporation/condensation.

The grooves are preferably of a cross-sectional area such that, with the desired configuration of the collector and inclination for a particular installation, they accommodate a volumetric flow rate of about 13 to 16 pounds fluid per square foot of collector area per hour, or more preferably about 14.7 pounds per square foot per hour, as is well known to be an efficient rate for flat plate collectors of this general type and function.

The collector of the invention is advantageously used in other types of installations than that shown in FIG. 1. For example, one particularly beneficial and preferred installation is with series of such collectors precast as roof slabs for a building. If the slabs must span long distances in a roof, thick slabs may be used, with appropriate reinforcement, and with the slab 10 as shown in FIG. 1 comprising only the topmost portion of the total precast roof slab. Essentially only the surface of existing types of concrete roof slabs, for inclined installation, need be modified to incorporate the principles of the invention. The header 15, gutter 16, grooves 17 and frame-mating perimeter 18 can be formed on any standard precast roof slab without in any way departing from the invention.

The photothermal conversion surface 14 is coated with an impermeable coating to prevent the heat transfer fluid flow from permeating the concrete slab 10, which would decrease insulating characteristics. The coating should have a high surface rugosity to facilitate the spreading of the heat transfer liquid 20 by capillary action. Preferably the coating should have spectral selectivity, meaning a high absorptivity for light radiation and low emissivity for thermal radiation. It is one of the objects of the present invention to provide such selective coatings, which, although well known in the field of solar energy, have not been previously available for open-flow or sheet-flow type solar collectors, mainly due to their degradation in contact with hot water. But with a conversion surface made of concrete, I found that two selective coatings can be achieved: the first such coating that may be used is a cermet, or metallic ceramic, sprayed as a powdered mixture through a torch such as a Thermospray gun, and thus fused to the conversion surface 14 of the concrete slab 10. By using appropriate oxides in the mix and appropriate oxide to flux (the ceramic base) ratio, the desired selectivity can be achieved. Techniques for achieving the desired surface finish are known in the art.

Another way of achieving the same coating is by covering the ungrooved concrete slab 10 with a thick layer of wet cermet, forming grooves 17 in this layer and then exposing this cermet layer to high heat to glaze it.

Another type of selective coating can be achieved by covering an epoxy-tar coating, freshly sprayed on the photothermal conversion surface 14, with finely powdered iron oxide particles, and embedding the particles in the epoxy-tar binder by brushing or tamping. Once the epoxy-tar compound has dried, excess iron oxide particles can be recovered. This coating also is durable and impermeable.

The header 15, shown in FIGS. 3 and 4, is an important feature for insuring that the heat transfer fluid 20 will flow equally over all of the photothermal conversion surface 14. The header 15 comprises a trough 21 running the width of the photothermal conversion surface 14 and having side edges 22 and front and rear edges 23a and 23b. The volume of the trough preferably is as small as possible, without being so small as to provide significant flow restriction of the liquid moving toward the upper ends of the grooves.

The trough 21 is covered over by a cover plate (FIGS. 3 and 4) preferably comprising a thin sheet of non-corroding metal coated matte black on the side exposed to light radiation. The thin sheet 24 is secured in a sealed way on the concrete slab at the rear edge 23b and at the side edges 22, and rests on the peaks of the grooves 17 for a certain length 25, defining totally enclosed water passages 26 from the header trough 21 to the photothermal conversion surface 14. The trough 21 has a surface 27 which preferably slopes gently toward the water passages 16 when the collector is at the installed angle of inclination. The small volume of the covered trough 21 helps assure that it will be substantially flooded during normal operation of the system. The flooding of the header assures that each groove will be fed by liquid. Pump pressure should be adequate to keep the header filled, even if the collector is not installed with the grooves 17 parallel to the true inclination fall line. Even if the header or trough is not completely filled, the heat transfer liquid will pool behind the flow resistance defined by the passages 26, assuring even distribution.

In cases where the same form is used to cast concrete slabs 10 of identical width but different length, the header volume and pressure have to be appropriately modified to increase or decrease the speed of the flowing liquid, assuming a preselected volumetric flow rate per square foot of collector area is to be maintained.

The bottom gutter 16 (FIG. 1) is only partially covered by a thin non-corroding sheet 28, and is of a volume large enough to prevent flooding at the normal flow volume. I.e., the bottom gutter 16 does not completely fill.

Inlet 33 and outlet 34 piping is preferably plastic pipe such as EPDM or PVC embedded in the concrete.

The double glazed frame 30 (FIG. 3) preferably is substantially rigid, but may be of a flexible material if it is adequately secured to the slab. The frame is provided preferably with a ridge 35 that matches the groove 19 in the border 18 of the concrete slab 10. The double glazing could be any combination of glass and/or plastic glazing. A preferred construction for the system of FIG. 1 uses very thin Teflon, which may be only about one mil thick, as inner glazing 31, and Tedlar, which may be approximately five mils thick, as outer glazing 32. These layers may be secured to the frame 30 in any suitable manner. Teflon is advantageous as an inner glazing because it is resistant to corrosion and ultraviolet radiation. Its relatively low structural strength is sufficient as a boundary wall for the heat transfer fluid. Also, its index of refraction is nearly the same as water (usually used as the heat transfer fluid), so that reflection at that interface is minimal. Tedlar is preferred as the outer glazing 32 because of its high structural strength and resistance to ultraviolet, as well as its capability of shrinking tightly on the frame 30 when heated to higher than operating temperature and then cooled.

Instead of covering the entire concrete slab as illustrated in the drawings, the frame and glazings can be formed as units, with one or more secured on a slab of much larger area, and the appended claims are intended to include such an arrangement.

In the concrete slab 10 are anchored all the inserts needed to handle the concrete slab, to install it (such as inserts 36 and 37—FIG. 1) and to secure the frame (insert 38—FIG. 2).

FIGS. 5 and 6 show a solar collector 50 according to the invention, in a form it may take for use in a thermosiphoning system 52. In such a system a heat exchanger 53 or other heat usage point is located at a higher elevation than the collector 50.

In a thermosiphoning system the grooves 17 of the collector preferably still have the same general "gothic arch" cross-sectional shape, but preferably are of larger dimensions, such as 0.125" deep and 0.250" wide to permit an upward flow less restricted by surface tension. Also the inner glazing 31 (as shown in FIG. 3) of the collector in the FIG. 5 system must be rigid because of the pressure head of the liquid against the inner glazing. The glazing can be glass or a rigid plastic.

As shown in FIG. 5, a header 54 on the collector 50 is of a different shape, to funnel the upwardly flowing heated liquid into an outlet conduit 55.

In order to achieve the highest efficiency possible from the open-flow collector of this invention, it should be used in a closed loop system, such as described in FIG. 1, and the heat transfer fluid 20 should be distilled water to which is added an antistatic agent that provides the needed ions to annul the static charges of the inner glazing 14 and coating. Such a heat transfer fluid prevents build-up of deposits and the formation of stationary air bubbles.

It is clear that the collector of the invention can be used for a variety of applications requiring delivered temperatures up to 150° F. Such applications could be domestic hot water for individual homes or multiple unit apartment houses, or for residential or commercial heating industrial process heating etc. The piping connections as well as all the hardware needed for connection and erection will of course reflect the particulars of each typical installation, such as size and environment. Concrete slabs can readily be produced to custom fit special applications.

As herein described and illustrated, the solar collectors of the invention include two layers of glazing; however, it should be understood that an additional layer or layers can be included for enhanced insulation, preferably also attached and supported by the frame 30.

Other embodiments and variations to these preferred embodiments will be apparent to those skilled in the art and may be made without departing from the spirit and scope of the invention as defined in the following claims.

I claim:

1. A sheet-flow type solar collector, comprising a reinforced concrete slab acting as a backing insulation and having an upper surface acting as a photothermal conversion surface, an inner glazing substantially in contact with the conversion surface, an outer glazing spaced from the inner glazing, means retaining the two glazings to the slab, the inner glazing serving to contain the flow of a heat transfer fluid along the conversion surface and the outer glazing serving to reduce convection and radiation heat losses, the conversion surface including a series of parallel grooves from the upper end of the slab to the lower end, with ridges between the grooves and with the inner glazing resting substantially on the ridges, for containing the heat transfer fluid in the grooves and under the inner glazing, means for admitting the heat transfer fluid to flow longitudinally over the conversion surface, and means for collecting heated transfer fluid from the conversion surface, the concrete slab being at least about two inches thick and of good insulation properties, the photothermal conversion surface being coated with an impermeable cermet solar selective coating having high absorptivity to light radiation and low emissivity for thermal radiation, said coating further having an exposed surface of high capillarity.

2. A sheet-flow type solar collector, comprising a reinforced concrete slab acting as a backing insulation and having an upper surface acting as a photothermal conversion surface, the photothermal conversion surface being coated with an impermeable cermet coating having high absorptivity to light radiation and low emissivity for thermal radiation, said coating further having an exposed surface of high capillarity, with fluid-conducting channels in said upper surface with ridges between the channels, an inner glazing substantially in contact with the ridges, an outer glazing spaced from the inner glazing, means retaining the two glazings to the slab, the inner glazing serving to contain the flow of a heat transfer fluid along the conversion surface and the outer glazing serving to reduce convection and radiation heat losses, and means for admitting the heat transfer fluid to flow longitudinally over the conversion surface, in the fluid-conducting channels, and means for collecting heated transfer fluid from the conversion surface, the concrete slab being at least about two inches thick and of good insulation properties, cast with formed voids spaced closely to the conversion surface, said means for admitting fluid including an input header at the upper, upstream end of the slab, comprising a trough extending laterally through substantially the width of the photothermal conversion surface, formed in the slab's surface and having a gentle downstream slope in the installed, inclined configuration of the collector, leading to the upstream end of the conversion surface, and including a cover plate over the trough and extending to the photothermal conversion surface, providing an exit for heat transfer fluid from the trough to the conversion surface.

3. A sheet-flow type solar collector, comprising a reinforced concrete slab acting as a backing insulation and having an upper surface acting as a photothermal conversion surface, the photothermal conversion surface being coated with an impermeable cermet coating having high absorptivity to light radiation and low emissivity for thermal radiation, said coating further having an exposed surface of high capillarity, with an inner glazing substantially in contact with the conversion surface, an outer glazing spaced from the inner glazing, and means retaining the two glazings to the slab, the inner glazing serving to contain the flow of a heat transfer fluid along the conversion surface and the outer glazing serving to reduce convection and radiation heat losses, the conversion surface including a series of parallel grooves from the upper end of the slab to the lower end, with ridges between the grooves and with the inner glazing resting substantially on the ridges, for containing the heat transfer fluid in the grooves and under the inner glazing, the grooves being of such cross-sectional area, for the inclination of the collector in a particular installation, as to accommodate about 13 to 16 pounds fluid per square foot of collector area per hour, means for admitting the heat transfer fluid to flow longitudinally over the conversion surface, and means for collecting heated transfer fluid from the conversion surface, the concrete slab being at least about two inches thick and of good insulation properties.

4. A sheet-flow type solar collector, comprising a reinforced concrete slab acting as a backing insulation and having an upper surface acting as a photothermal conversion surface, the photothermal conversion surface being coated with an impermeable cermet coating having high absorptivity to light radiation and low emissivity for thermal radiation, said coating further having an exposed surface of high capillarity, with an inner glazing substantially in contact with the conversion surface, an outer glazing spaced from the inner glazing, and means retaining the two glazings to the slab, the inner glazing serving to contain the flow of a heat transfer fluid along the conversion surface and the outer glazing serving to reduce convection and radiation heat losses, the conversion surface including a series of parallel grooves from the upper end of the slab to the lower end, with ridges between the grooves and with the inner glazing resting substantially on the ridges, for containing the heat transfer fluid in the grooves and under the inner glazing, the grooves being of such cross-sectional area, for the inclination of the collector in a particular installation, as to accommodate about 13 to 16 pounds fluid per square foot of collector area per hour, means for admitting the heat tranfer fluid to flow longitudinally over the conversion surface, including an input header at the upper, upstream end of the slab, comprising a trough extending laterally through substantially the width of the photothermal conversion surface, formed in the slab's surface and having a gentle downstream slope in the installed, inclined configuration of the collector, leading to the grooves generally at the level of their bottoms, and including a cover plate over the trough and extending to the photothermal conversion surface and substantially in contact with the upstream ends of the ridges between the grooves, forming heat transfer fluid passages at the upstream ends of the grooves, whereby heat transfer fluid pools behind the passages and is evenly distributed to the passages and the grooves, and means for collecting heated transfer fluid from the conversion surface, the concrete slab being at least about two inches thick and of good insulation properties.

5. A sheet-flow type solar collector, comprising a reinforced concrete slab acting as a backing insulation and having an upper surface acting as a photothermal conversion surface, the photothermal surface being coated with an impermeable polymeric coating having high absorptivity to light radiation and low emissivity for thermal radiation, said coating further having an exposed surface of high capillarity, with fluid-conducting channels in said upper surface with ridges between the channels, an inner glazing substantially in contact with the ridges, an outer glazing spaced from the inner glazing, means retaining the two glazings to the slab, the inner glazing serving to contain the flow of a heat transfer fluid along the conversion surface and the outer glazing serving to reduce convection and radiation heat losses, and means for admitting the heat transfer fluid to flow longitudinally over the conversion surface, in the fluid-conducting channels, and means for collecting heated transfer fluid from the conversion surface, the concrete slab being at least about two inches thick and of good insulation properties, cast with formed voids spaced closely to the conversion surface, said means for admitting fluid including an input header at the upper, upstream end of the slab, comprising a trough extending laterally through substantially the width of the photothermal conversion surface, formed in the slab's surface and having a gentle downstream slope in the installed, inclined configuration of the collector, leading to the upstream end of the conversion surface, and including a cover plate over the trough and extending to the photothermal conversion surface, providing an exit for heat transfer fluid from the trough to the conversion surface.

6. A sheet-flow type solar collector, comprising a reinforced concrete slab acting as a backing insulation and having an upper surface acting as a photothermal conversion surface, the photothermal conversion surface being coated with an impermeable polymeric coating having high absorptivity to light radiation and low emissivity for thermal radiation, said coating further having an exposed surface of high capillarity, with an inner glazing substantially in contact with the conversion surface, an outer glazing spaced from the inner glazing, and means retaining the two glazings to the slab, the inner glazing serving to contain the flow of a heat transfer fluid along the conversion surface and the outer glazing serving to reduce convection and radiation heat losses, the conversion surface including a series of parallel grooves from the upper end of the slab to the lower end, with ridges between the grooves and with the inner glazing resting substantially on the ridges, for containing the heat transfer fluid in the grooves and under the inner glazing, the grooves being of such cross-sectional area, for the inclination of the collector in a particular installation, as to accommodate about 13 to 16 pounds fluid per square foot of collector area per hour, means for admitting the heat transfer fluid to flow longitudinally over the conversion surface, and means for collecting heated transfer fluid from the conversion surface, and means for collecting heated transfer fluid from the conversion surface, the concrete slab being at least about two inches thick and of good insulation properties.

7. A sheet-flow type solar collector, comprising a reinforced concrete slab acting as a backing insulation and having an upper surface acting as a photothermal conversion surface, the photothermal conversion surface being coated with an impermeable polymeric coating having high absorptivity to light radiation and low emissivity for thermal radiation, said coating further having an exposed surface of high capillarity, with an inner glazing substantially in contact with the conversion surface, an outer glazing spaced from the inner glazing, and means retaining the two glazings to the slab, the inner glazing serving to contain the flow of a heat transfer fluid along the conversion surface and the outer glazing serving to reduce convection and radiation heat losses, the conversion surface including a series of parallel grooves from the upper end of the slab to the lower end, with ridges between the grooves and with the inner glazing resting substantially on the ridges, for containing the heat transfer fluid in the grooves and under the inner glazing, the grooves being of such cross-sectional area, for the inclination of the collector in a particular installation, as to accommodate about 13 to 16 pounds fluid per square foot of collector area per hour, means for admitting the heat transfer fluid to flow longitudinally over the conversion surface, including an input header at the upper, upstream end of the slab, comprising a trough extending laterally through substantially the width of the photothermal conversion surface, formed in the slab's surface and having a gentle downstream slope in the installed, inclined configuration of the collector, leading to the grooves generally at the level of their bottoms, and including a cover plate over the trough and extending to the photothermal conversion surface and substantially in contact with the upstream ends of the ridges between the grooves, forming heat transfer fluid passages at the upstream ends of the grooves, whereby heat transfer fluid pools behind the passages and is evenly distributed to the passages and the grooves, and means for collecting heated transfer fluid from the conversion surface, the concrete slab being at least about two inches thick and of good insulation properties.

8. A sheet-flow type solar collector system comprising a reinforced concrete slab acting as a backing insulation and having an upper surface acting as a photothermal conversion surface, including fluid-conducting channels in the upper surface with ridges between the channels, an inner glazing substantially in contact with the ridges, an outer glazing spaced from the inner glazing, means retaining the two glazings to the slab, the inner glazing serving to contain the flow of a heat transfer fluid along the conversion surface and the outer glazing serving to reduce convection and radiation heat losses, and means for admitting the heat transfer fluid to flow longitudinally over the conversion surface, in the fluid-conducting channels, and means for collecting heated transfer fluid from the conversion surface, the concrete slab being at least about two inches thick and of good insulation properties, cast with formed voids spaced closely to the conversion surface, said means for admitting fluid including an input header at the upper, upstream end of the slab, comprising a trough extending laterally through substantially the width of the photothermal conversion surface, formed in the slab's surface and having a gentle downstream slope in the installed, inclined configuration of the collector, leading to the upstream end of the conversion surface, and including a cover plate over the trough and extending to the photothermal conversion surface, providing an exit for heat transfer fluid from the trough to the conversion surface, said solar collector system being in a closed loop arrangement with a liquid receiving chamber at the downstream end of the collector, connected to said means for collecting heated fluid, a heat exchanger, a pump and liquid conduits connecting them, the heat transfer fluid comprising distilled water containing an antistatic agent, for preventing build-up of deposits and the formation of stationary air bubbles, so that the entire conversion surface is flooded.

9. A sheet-flow type solar collector system comprising a reinforced concrete slab acting as a backing insulation and having an upper surface acting as a photothermal conversion surface, an inner glazing substantially in contact with the conversion surface, an outer glazing spaced from the inner glazing, means retaining the two glazings to the slab, the inner glazing serving to contain the flow of a heat transfer fluid along the conversion surface and the outer glazing serving to reduce convection and radiation heat losses, the conversion surface including a series of parallel grooves from the upper end of the slab to the lower end, with ridges between the grooves and with the inner glazing resting substantially on the ridges, for containing the heat transfer fluid in the grooves and under the inner glazing, the grooves being of such cross-sectional area, for the inclination of the collector in a particular installation, as to accommodate about 13 to 16 pounds fluid per square foot of collector area per hour, means for admitting the heat transfer fluid to flow longitudinally over the conversion surface, and means for collecting heated transfer fluid from the conversion surface, the concrete slab being at least about two inches thick and of good insulation properties, the solar collector system being in a closed loop arrangement with a liquid receiving chamber at the downstream end of the collector, a heat exchanger, a pump and liquid conduits connecting them, the heat transfer fluid comprising distilled water containing an antistatic agent, for preventing build-up of deposits and the formation of stationary air bubbles, so that the entire conversion surface is flooded.

10. A sheet-flow type solar collector system, comprising a reinforced concrete slab acting as a backing insulation and having an upper surface acting as a photothermal conversion surface, a rigid inner glazing substantially in contact with the conversion surface, an outer glazing spaced from the inner glazing, a frame supporting the outer glazing on its top surface and the inner glazing on its bottom surface, means for retaining the frame to the slab at the periphery of the conversion surface, the inner glazing serving to contain the flow of a heat transfer fluid along the conversion surface and the outer glazing serving to reduce convection and radiation heat losses, the conversion surface including a series of parallel grooves from the upper end of the slab to the lower end, with ridges between the grooves and with the inner glazing resting substantially on the ridges, for containing the heat transfer fluid in the grooves and under the inner glazing, the system being in a thermosiphoning closed loop arrangement including a heat exchanger at a higher level than the collector and conduit means for connecting the heat exchanger to the ends of the collector, said rigid inner glazing serving to hold fluid beneath it, the heat transfer fluid comprising distilled water containing an antistatic agent, and including means associated with the concrete slab for admitting the heat transfer fluid to flow longitudinally over the conversion surface, including an input header at the upper, upstream end of the slab, comprising a trough extending laterally through substantially the width of the photothermal conversion surface, formed in the slab's surface and having a gentle downstream slope in the installed, inclined configuration of the collector, leading to the grooves generally at the level of their bottoms, and including a cover plate over the trough and extending to the photothermal conversion surface and substantially in contact with the upstream ends of the ridges between the grooves, forming heat transfer fluid passages at the upstream ends of the grooves, whereby heat transfer fluid pools behind the passages and is evenly distributed to the passages and the grooves, and means for collecting heated transfer fluid from the conversion surface, connected to said connecting means, the concrete slab being at least about two inches thick and of good insulation properties.

11. A sheet-flow type solar collector, comprising a reinforced concrete slab acting as a backing insulation and having an upper surface acting as a photothermal conversion surface, the photothermal conversion surface being coated with an impermeable cermet coating having high absorptivity to light radiation and low emissivity for thermal radiation, said coating further having an exposed surface of high capillarity, with an inner glazing substantially in contact with the conversion surface, an outer glazing spaced from the inner glazing, a frame supporting the outer glazing on its top surface and the inner glazing on its bottom surface, means for retaining the frame to the slab at the periphery of the conversion surface, the inner glazing serving to contain the flow of a heat transfer fluid along the conversion surface and the outer glazing serving to reduce convection and radiation heat losses, the conversion surface including a series of parallel grooves from the upper end of the slab to the lower end, with ridges between the grooves and with the inner glazing resting substantially on the ridges, for containing the heat transfer fluid in the grooves and under the inner glazing, means for admitting the heat transfer fluid to flow longitudinally over the conversion surface, the means for admitting fluid including an input header at the upper, upstream end of the slab, comprising a trough extending laterally through substantially the width of the photothermal conversion surface, formed in the slab's surface and having a gentle downstream slope in the installed, inclined configuration of the collector, leading to the grooves generally at the level of their bottoms, and including a cover plate over the trough and extending to the photothermal conversion surface and substantially in contact with the upstream ends of the ridges between the grooves, forming heat transfer fluid passages at the upstream ends of the grooves, whereby heat transfer fluid pools behind the passages and is evenly distributed to the passages and the grooves, and means for collecting heated transfer fluid from the conversion surface, the concrete slab being at least about two inches thick and of good insulation properties.

12. A sheet-flow type solar collector, comprising a reinforced concrete slab acting as a backing insulation and having an upper surface acting as a photothermal conversion surface, the photothermal conversion surface being coated with an impermeable polymeric coating having high absorptivity to light radiation and low emissivity for thermal radiation, said coating further having an exposed surface of high capillarity, with an inner glazing substantially in contact with the conversion surface, an outer glazing spaced from the inner glazing, a frame supporting the outer glazing on its top surface and the inner glazing on its bottom surface, means for retaining the frame to the slab at the periphery of the conversion surface, the inner glazing serving to contain the flow of a heat transfer fluid along the conversion surface and the outer glazing serving to reduce convection and radiation heat losses, the conversion surface including a series of parallel grooves from the upper end of the slab to the lower end, with ridges between the grooves and with the inner glazing resting substantially on the ridges, for containing the heat transfer fluid in the grooves and under the inner glazing, means for admitting the heat transfer fluid to flow longitudinally over the conversion surface, the means for admitting fluid including an input header at the upper, upstream end of the slab, comprising a trough extending laterally through substantially the width of the photothermal conversion surface, formed in the slab's surface and having a gentle downstream slope in the installed, inclined configuration of the collector, leading to the grooves generally at the level of their bottoms, and including a cover plate over the trough and extending to the photothermal conversion surface and substantially in contact with the upstream ends of the ridges between the grooves, forming heat transfer fluid passages at the upstream ends of the grooves, whereby heat transfer fluid pools behind the passages and is evenly distributed to the passages and the grooves, and means for collecting heated transfer fluid from the conversion surface, the concrete slab being at least about two inches thick and of good insulation properties.

13. The sheet-flow type solar collector of claim 2, claim 3 or claim 4, said coating being applied to the photothermal conversion surface as a powdered mixture sprayed through a flame and thus fused to the surface of the concrete slab.

14. A solar collector system including the solar collector of claim 2, claim 3 or claim 4, in a closed loop arrangement with a liquid receiving chamber at the downstream end of the collector, a heat exchanger, a pump and liquid conduits connecting them, the heat transfer fluid comprising distilled water containing an antistatic agent, for preventing build-up of deposits and the formation of stationary air bubbles, so that the entire conversion surface is flooded.

15. The sheet-flow type solar collector of claim 5, claim 6 or claim 7, wherein the coating is an epoxy-tar coating, sprayed on the grooved photothermal conversion surface and impregnated with black iron oxide powder while still wet.

* * * * *